(12) United States Patent
Bacastow (10) Patent No.: US 8,011,013 B2
(45) Date of Patent: Aug. 30, 2011

(54) METHOD FOR SECURING AND CONTROLLING USB PORTS

(75) Inventor: Steven V. Bacastow, Cumming, GA (US)

(73) Assignee: QuickVault, Inc., Cumming, GA (US)

( * ) Notice: Subject to any disclaimer, the term of this patent is extended or adjusted under 35 U.S.C. 154(b) by 1026 days.

(21) Appl. No.: 11/879,162

(22) Filed: Jul. 16, 2007

(65) Prior Publication Data

US 2008/0022360 A1    Jan. 24, 2008

Related U.S. Application Data

(60) Provisional application No. 60/832,003, filed on Jul. 19, 2006.

(51) Int. Cl.
*G06F 21/00* (2006.01)
(52) U.S. Cl. .................... 726/27; 726/4; 726/26
(58) Field of Classification Search .............. 726/9, 4, 726/28, 34–35, 20, 17; 713/193–194, 185, 713/165

See application file for complete search history.

(56) References Cited

U.S. PATENT DOCUMENTS

| | | | |
|---|---|---|---|
| 5,331,136 A | 7/1994 | Koench et al. |
| 5,566,339 A | 10/1996 | Perholtz et al. |
| 5,592,618 A | 1/1997 | Micka et al. |
| 5,696,909 A | 12/1997 | Wallner |
| 5,790,074 A | 8/1998 | Rangedahl et al. |
| 5,844,776 A | 12/1998 | Yamaguchi et al. |
| 5,956,733 A | 9/1999 | Nakano et al. |
| 5,979,753 A | 11/1999 | Roslak |
| 6,003,008 A | 12/1999 | Postrel et al. |
| 6,062,478 A | 5/2000 | Izaguirre et al. |
| 6,166,688 A | 12/2000 | Cromer et al. |
| 6,442,682 B1 | 8/2002 | Pothapragada et al. |
| 6,546,441 B1 | 4/2003 | Lum |
| 6,553,348 B1 | 4/2003 | Hashimoto |
| 6,574,716 B2 | 6/2003 | Dovi |
| 6,614,349 B1 | 9/2003 | Proctor et al. |
| 6,640,217 B1 | 10/2003 | Scanlan et al. |
| 6,704,885 B1 | 3/2004 | Salas-Meza et al. |
| 6,950,949 B1 | 9/2005 | Gilchrist |
| 7,103,684 B2 | 9/2006 | Chen et al. |

(Continued)

FOREIGN PATENT DOCUMENTS

WO    WO 03/009620    1/2003

OTHER PUBLICATIONS

Iomega Automatic Backup Manual Table of Contents (hereafter "IAB" archived on Dec. 22, 2002 at: http://web.archive.org/web/20021222172018/http://www.iomega.com/support/manuals/ioauto/main.html (linking to 22 pages—hereafter "IAB1" ... "IAB22").

(Continued)

*Primary Examiner* — Minh Dinh
*Assistant Examiner* — Venkat Perungavoor
(74) *Attorney, Agent, or Firm* — King & Spalding LLP (57) ABSTRACT

A method for limiting devices and controlling the applications executed from USB ports on personal computers (PCs). More specifically, the present invention relates to a method for ensuring that only authorized devices and applications are accessed from USB ports using software and configuration files on the PC. Using the software application stored on the PC storage device in conjunction with functionality performed by a designed security file server, the use of USB applications and devices is limited to authorized applications and devices.

14 Claims, 6 Drawing Sheets

U.S. PATENT DOCUMENTS

| | | | |
|---|---|---|---|
| 7,143,289 B2 | 11/2006 | Denning et al. |
| 7,165,154 B2 | 1/2007 | Coombs et al. |
| 7,225,208 B2 | 5/2007 | Midgley et al. |
| 7,229,016 B2 | 6/2007 | Bravo |
| 7,263,190 B1 | 8/2007 | Moritz |
| 7,269,732 B2 | 9/2007 | Kilian-Kehr |
| 7,356,510 B2 | 4/2008 | Durand et al. |
| 7,356,703 B2 | 4/2008 | Chebolu et al. |
| 7,403,743 B2 | 7/2008 | Welch |
| 7,404,088 B2 | 7/2008 | Giobbi |
| 7,421,516 B2 | 9/2008 | Minogue et al. |
| 7,561,691 B2 | 7/2009 | Blight et al. |
| 7,739,402 B2 | 6/2010 | Roese et al. |
| 2002/0082925 A1 | 6/2002 | Herwig |
| 2002/0188856 A1 | 12/2002 | Worby |
| 2002/0193157 A1 | 12/2002 | Yamada et al. |
| 2003/0005193 A1 | 1/2003 | Seroussi et al. |
| 2003/0046034 A1 | 3/2003 | Kitamoto et al. |
| 2003/0050940 A1 | 3/2003 | Robinson |
| 2003/0055792 A1 | 3/2003 | Kinoshita et al. |
| 2003/0074575 A1 | 4/2003 | Hoberock et al. |
| 2003/0110371 A1 | 6/2003 | Yang et al. |
| 2003/0135418 A1 | 7/2003 | Shekhar et al. |
| 2003/0174167 A1 | 9/2003 | Poo et al. |
| 2003/0225971 A1 | 12/2003 | Oishi et al. |
| 2003/0233501 A1 | 12/2003 | Ma et al. |
| 2004/0001088 A1 | 1/2004 | Stancil et al. |
| 2004/0019742 A1 | 1/2004 | Wei et al. |
| 2004/0038592 A1 | 2/2004 | Yang |
| 2004/0039575 A1 | 2/2004 | Bum |
| 2004/0039851 A1 | 2/2004 | Tang et al. |
| 2004/0039854 A1 | 2/2004 | Estakhri et al. |
| 2004/0095382 A1 | 5/2004 | Fisher et al. |
| 2005/0010768 A1 | 1/2005 | Light et al. |
| 2005/0010835 A1 | 1/2005 | Childs et al. |
| 2005/0081198 A1* | 4/2005 | Cho et al. ..................... 717/174 |
| 2005/0125513 A1 | 6/2005 | Lam et al. |
| 2005/0138390 A1 | 6/2005 | Adams et al. |
| 2005/0144443 A1 | 6/2005 | Cromer et al. |
| 2005/0149394 A1 | 7/2005 | Postrel |
| 2005/0149684 A1 | 7/2005 | Sankaran et al. |
| 2005/0149745 A1 | 7/2005 | Ishidoshiro |
| 2005/0216466 A1* | 9/2005 | Miyamoto et al. ................ 707/9 |
| 2006/0010325 A1 | 1/2006 | Liu et al. |
| 2006/0041934 A1 | 2/2006 | Hetzler |
| 2006/0206720 A1* | 9/2006 | Harada et al. ................. 713/182 |
| 2006/0209337 A1* | 9/2006 | Atobe et al. ................. 358/1.15 |
| 2006/0253620 A1* | 11/2006 | Kang ............................. 710/36 |
| 2007/0081508 A1 | 4/2007 | Madhavan et al. |
| 2007/0143529 A1 | 6/2007 | Bacastow |
| 2007/0214047 A1 | 9/2007 | Antonello et al. |
| 2007/0245158 A1 | 10/2007 | Giobbi et al. |
| 2008/0022003 A1 | 1/2008 | Alve |

OTHER PUBLICATIONS http://web.archive.org/web/20021030183837/www.iomega.com/support/manuals/ioauto/qs_setup.html (hereafter "IAB1") (archived in 2002).

http://web.archive.org/web/20021223082620/www.iomega.com/support/manuals/ioauto/qs_schedule.html (hereafter "IAB11") (archived in 2002).

http://web.archive.org/web/20021223081144/www.iomega.com/support/manuals/ioauto/qs_cache.html (herefter "IAB12") (archived in 2002).

http://web.archive.org/web/20021223075646/www.iomega.com/support/manuals/ioauto/qs_nomonitor.html (hereafter "IAB13") (archived in 2002).

http://web.archive.org/web20021223081714/www.iomega.com/support/manuals/ioauto/qs_restore.html (hereafter "IAB15") (archived in 2002).

* cited by examiner

Figure 2 – Unauthorized Application

Local or Remote User

① USB storage device with un-authorized application
② Laptop (PC)

1. A USB flash storage device containing a unauthorized application is inserted to local or remote PC.
2. The invention on the PC is configured to prevent the application on the USB device from executing.

Figure 3 – Authorized Application

Local or Remote User

1. USB storage device with an authorized application
2. Laptop (PC)

1. A USB flash storage device containing an authorized application is inserted to local or remote PC.
2. The invention on the PC is configured to allow the application on the USB to execute.

Figure 4 – Unauthorized Device

Figure 5 – Authorized Device

Figure 6 – Periodic Updates

1. A PC containing the software that comprises the invention is configured to check for USB security updates that are stored on the server.
2. The file server responds to the message from the PC by sending updated USB security settings to the software on the PC.

METHOD FOR SECURING AND CONTROLLING USB PORTS

RELATED APPLICATION

Provisional Patent Application 60/832,003 filed on Jul. 19, 2006

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

The present invention relates to a method for limiting devices and controlling the applications executed from USB ports on personal computers (PCs). More specifically, the present invention relates to a method for ensuring that only authorized devices and applications are accessed from USB ports using software and configuration files on the PC.

BACKGROUND OF THE INVENTION

There has been a significant increase in the use of portable USB storage devices to store, backup, and transfer information between PCs and locations. Conventional methods for controlling the devices and applications that may be accessed from USB ports are insufficient to address the current and growing risk related to these devices and applications.

Individuals, corporations and government agencies are increasingly becoming uncomfortable with allowing employees and other authorized personnel to utilize portable USB storage devices to store or transfer sensitive data and information. However, current methods lack the ability to easily prevent or detect the use of USB storage devices and computer applications accessed from USB storage devices.

Current methods also lack the ability to allow an individual, a corporation or a government agency to effectively control types of other USB non-storage devices which may be utilized. These devices include printers, scanners, cameras, music players, and other devices which may or may not be authorized.

It is estimated that over 130 million portable USB storage devices will be sold worldwide in 2007. The majority of these devices are predicted to be "smart drives", which will include executable computer programs. These portable USB storage devices and the applications executed from them may not be authorized by the security policy or PC user. Therefore, as a result of the potential exposure related to USB devices, these devices are often prohibited by many corporate and government security policies. Although the devices themselves are often prohibited by policy, it is difficult to prevent or detect their usage with current methods.

This invention addresses these issues through a method which detects the use of portable USB storage devices and the applications executed from these devices and limits the devices and applications based on user defined criteria. Consequently, the invention may also be used to prevent or detect the use of other USB devices such as printers, scanners, cameras, music players, and other devices that can be attached to a USB port on a protected PC.

As a result of the limitations related to current methods, portable USB storage devices are considered to be a significant cause of exposure related to the potential loss of confidential data and information Therefore, a need exists for ensuring that only authorized devices and applications are accessed from USB ports that addresses these shortcomings in the prior art.

SUMMARY OF THE INVENTION

The present invention answers this need by providing a method for limiting the type of device and application that may be connected to, or executed from a USB port.

The invention consists of software that is either pre-loaded on the PC or installed and configured by the user. Software is configured to accommodate the levels of security as required by the user or organization. The configuration of security parameters may vary between PCs and organizations and may be controlled locally by the user or by a central rules database via connection through the internet or intranet connection.

In an embodiment of the present invention, the software is configured to limit (e.g. allow or deny) the use of devices connected via a USB port on the protected PC.

In other embodiments of the invention, the software is configured to limit (e.g. allow or deny) access to the files and applications stored on storage devices connected to the USB port on the protected PC.

It is thus an advantage of the present invention to provide a flexible method for selectively limiting devices and the files and applications executed from USB ports on protected personal computers. To this end, the present invention is new and unique in both its conception and implementation.

Embodiments of the present invention are described below by way of illustration. Other approaches to implementing the present invention and variations of the described embodiments may be constructed by a skilled practitioner and are considered within the scope of the present invention.

DETAILED DESCRIPTION OF THE INVENTION

Figure 1:
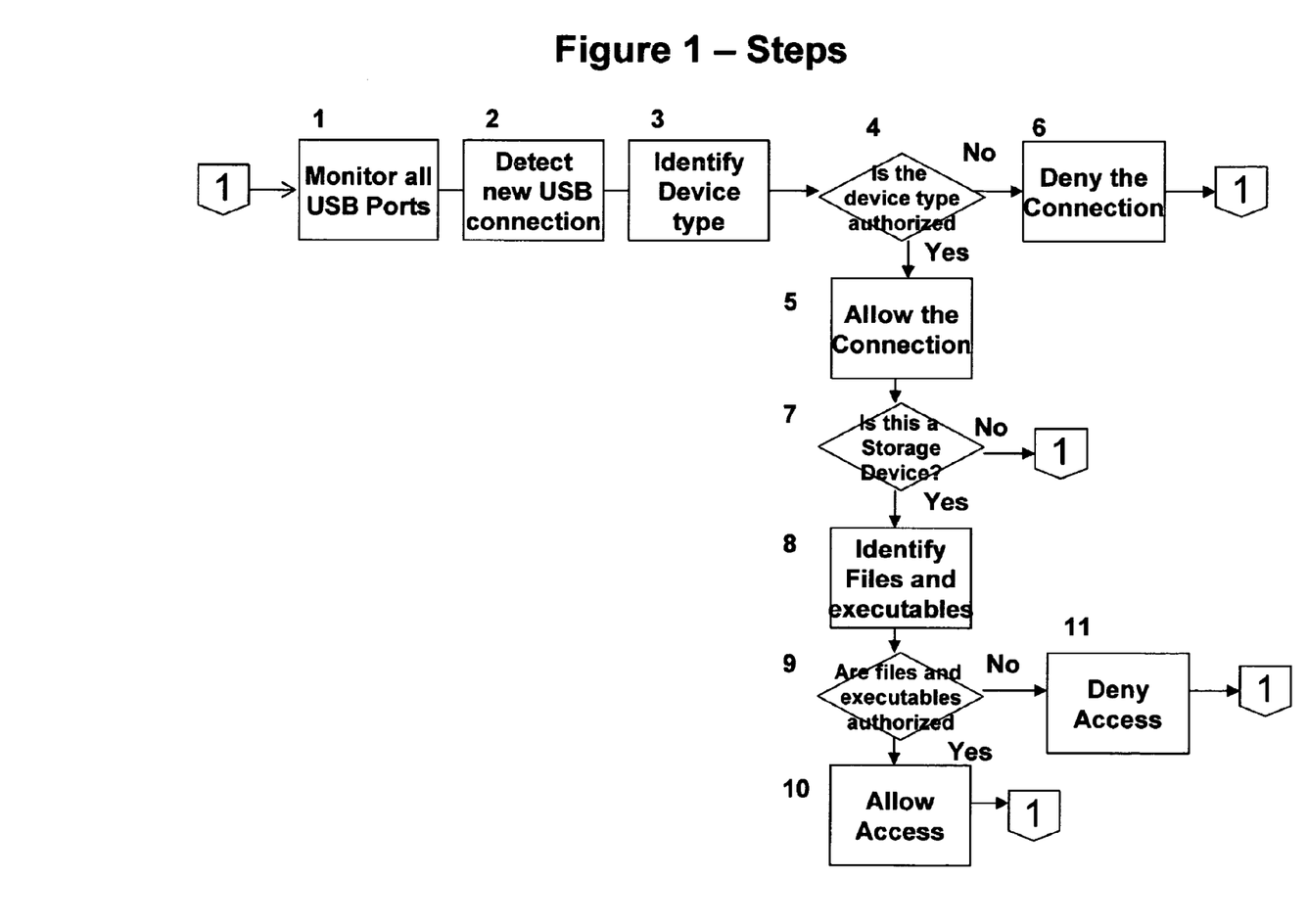
FIG. 1 shows the general steps that are followed by the invention in accordance with its method.

As shown on FIG. 1, the invention which includes a software module and parameter file is installed on the PC and configured to limit the use of USB devices and applications by using the following steps:
(i) Step 1—Continuously monitor all USB ports
(ii) Step 2—Detect a new device connected to a USB port.
(iii) Step 3—Identify the type of device.

(iv) Step 4—Compare the device type to the list of authorized devices stored in the invention's configuration parameter file.
  i. Step 5—If the device is authorized allow the connection
  ii. Step 6—If the device is unauthorized do not allow the connection
(v) Steps 7 and 8—If an authorized USB storage device is connected, examine the files and executables contained on the device.
  i. Steps 9 and 10—If the files and (or) executables are included in the list of authorized files and executables stored in the inventions configuration parameter file, allow these files to be accessed from the USB storage device.
  ii. Steps 9 and 11 If the files and (or) executables are not included in the list of authorized files and executables stored in the invention's configuration parameter file, deny access to the files.

Figure 2:
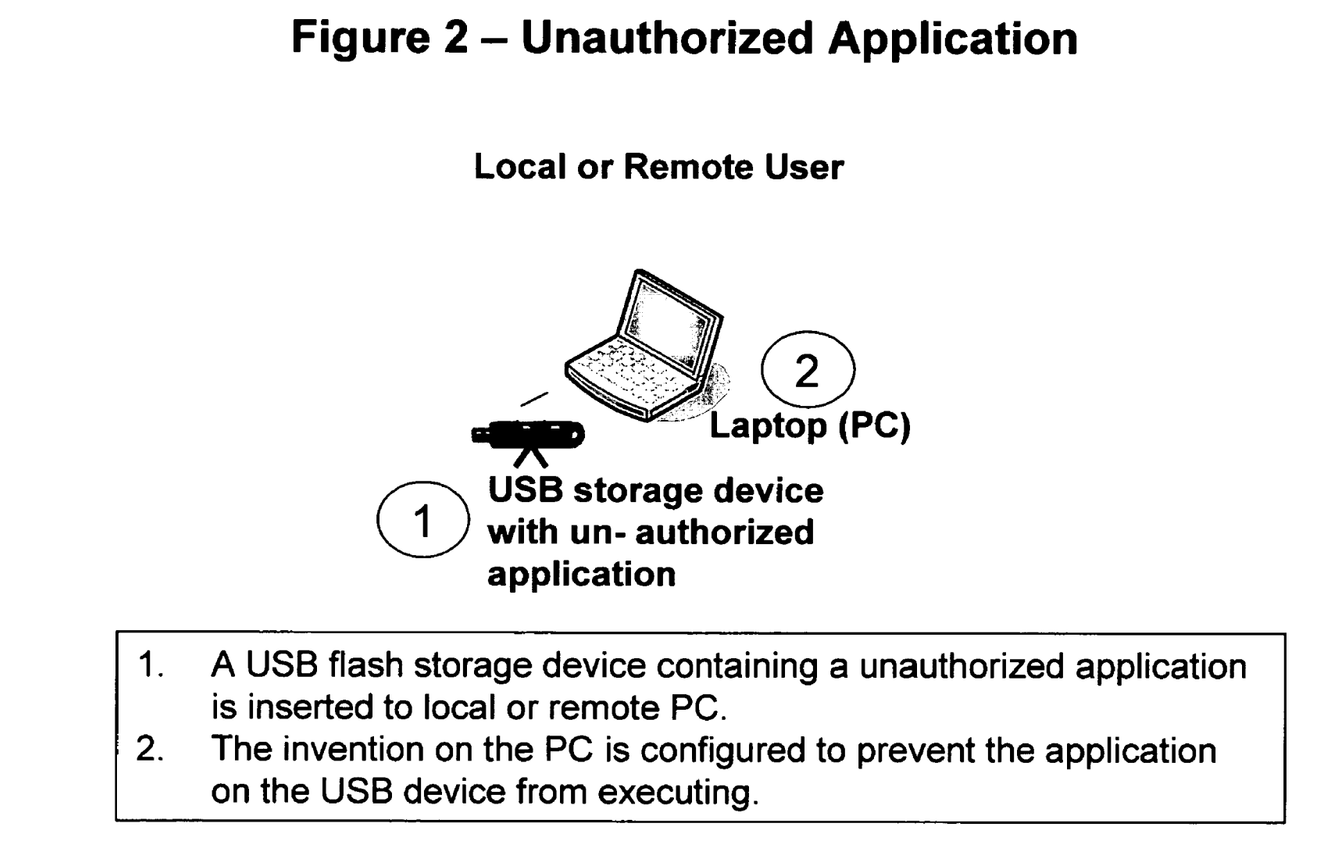
FIG. 2 shows an example whereby the invention denies access to an un-authorized USB storage device.

As shown in FIG. 2, a USB storage device containing unauthorized software, is inserted to local or remote PC. The invention installed on the PC and configured in accordance with the security policy detects the unauthorized executable program and prevents the software from functioning.

Figure 3:
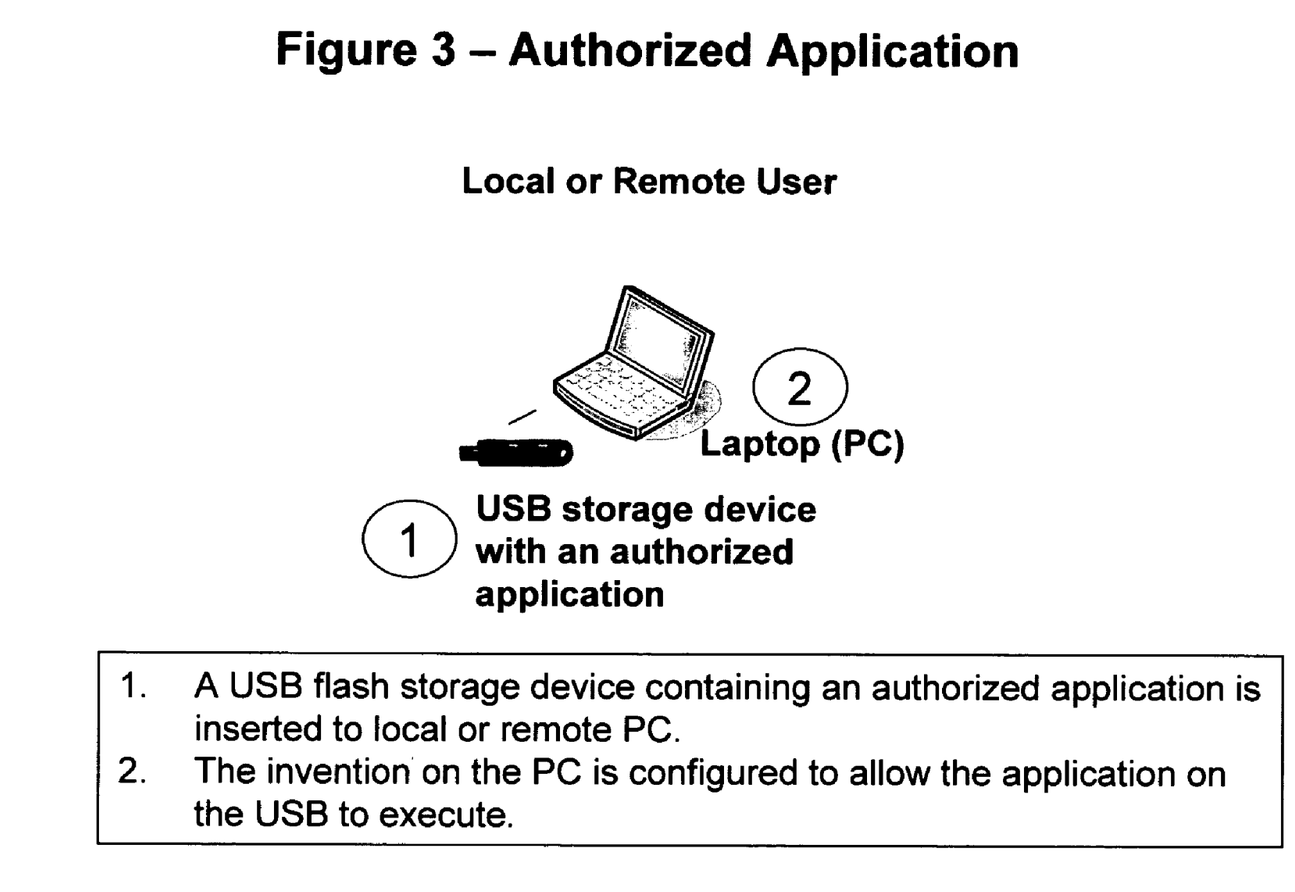
FIG. 3 shows an example whereby the invention allows access to an authorized USB storage device.

In another example as shown in FIG. 3, a USB storage device containing authorized software is inserted to a local or remote PC. The invention installed on the PC detects the authorized application and allows the program to execute in accordance with the security policy and configuration rules in place.

Figure 4:
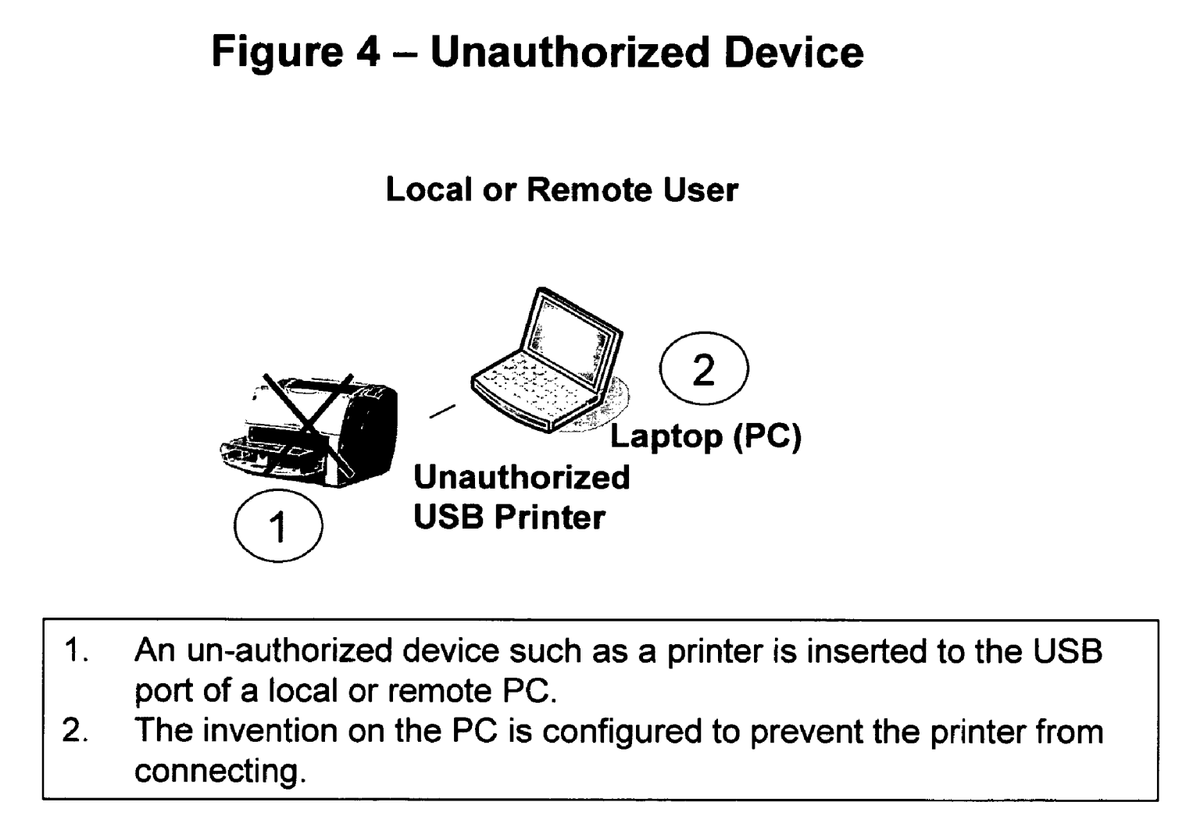
FIG. 4 shows an example whereby the invention denies access to an un-authorized USB non-storage device, in this case a printer.

In another example as shown in FIG. 4, an unauthorized USB non-storage device such as a printer, scanner, camera or other device is inserted into the USB port of a local or remote PC. The invention installed on the PC detects the unauthorized device and prevents the device from functioning in accordance with the security policy and configuration rules in place.

Figure 5:
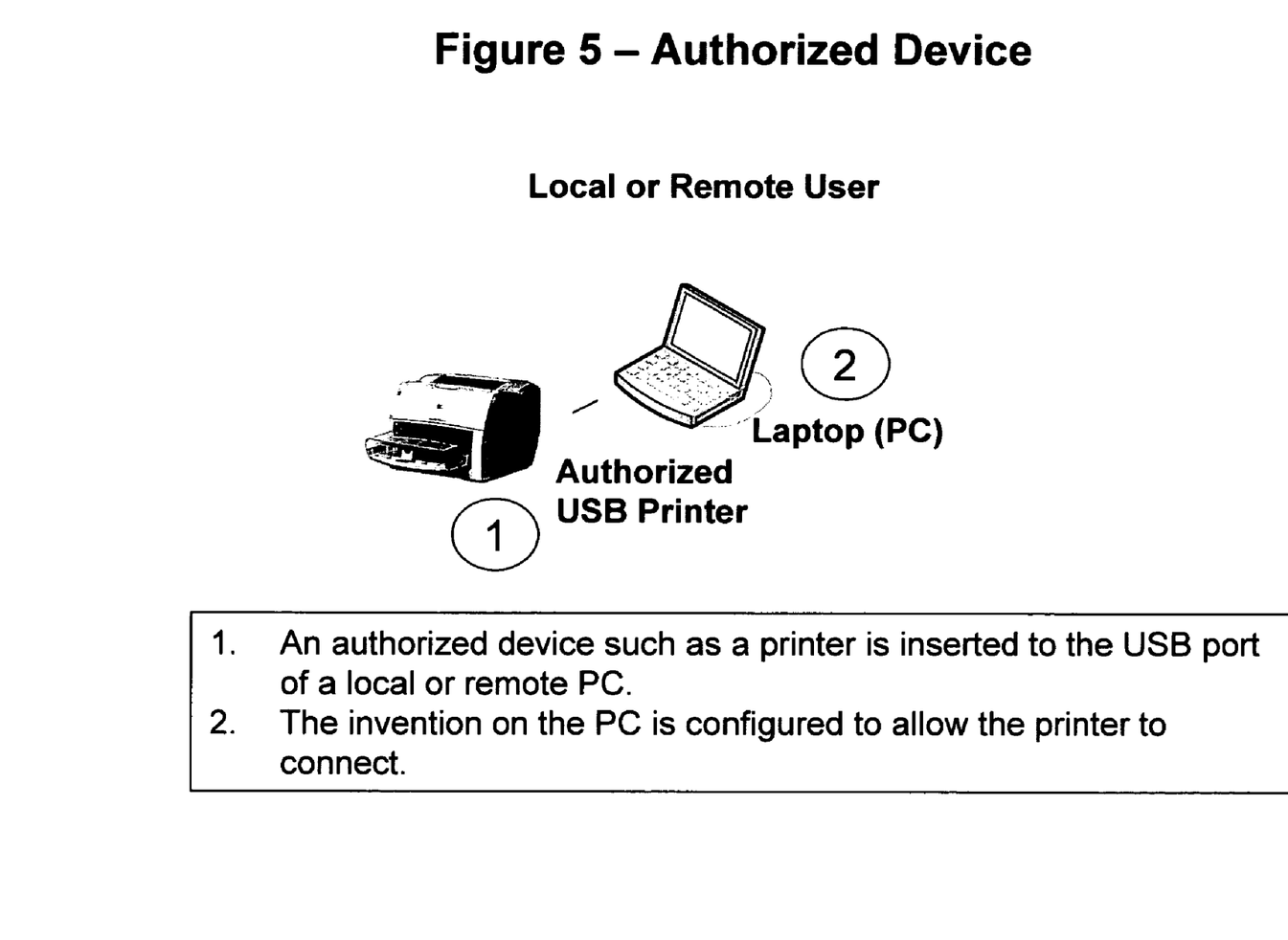
FIG. 5 shows an example whereby the invention allows access to an authorized USB non-storage device, in this case a printer.

In another example as shown in FIG. 5, an authorized USB non-storage device such as a printer, scanner, camera or other device is inserted into the USB port of a local or remote PC. The invention installed on the PC detects the authorized device and allows the device to function in accordance with the security policy and configuration rules in place.

Figure 6:
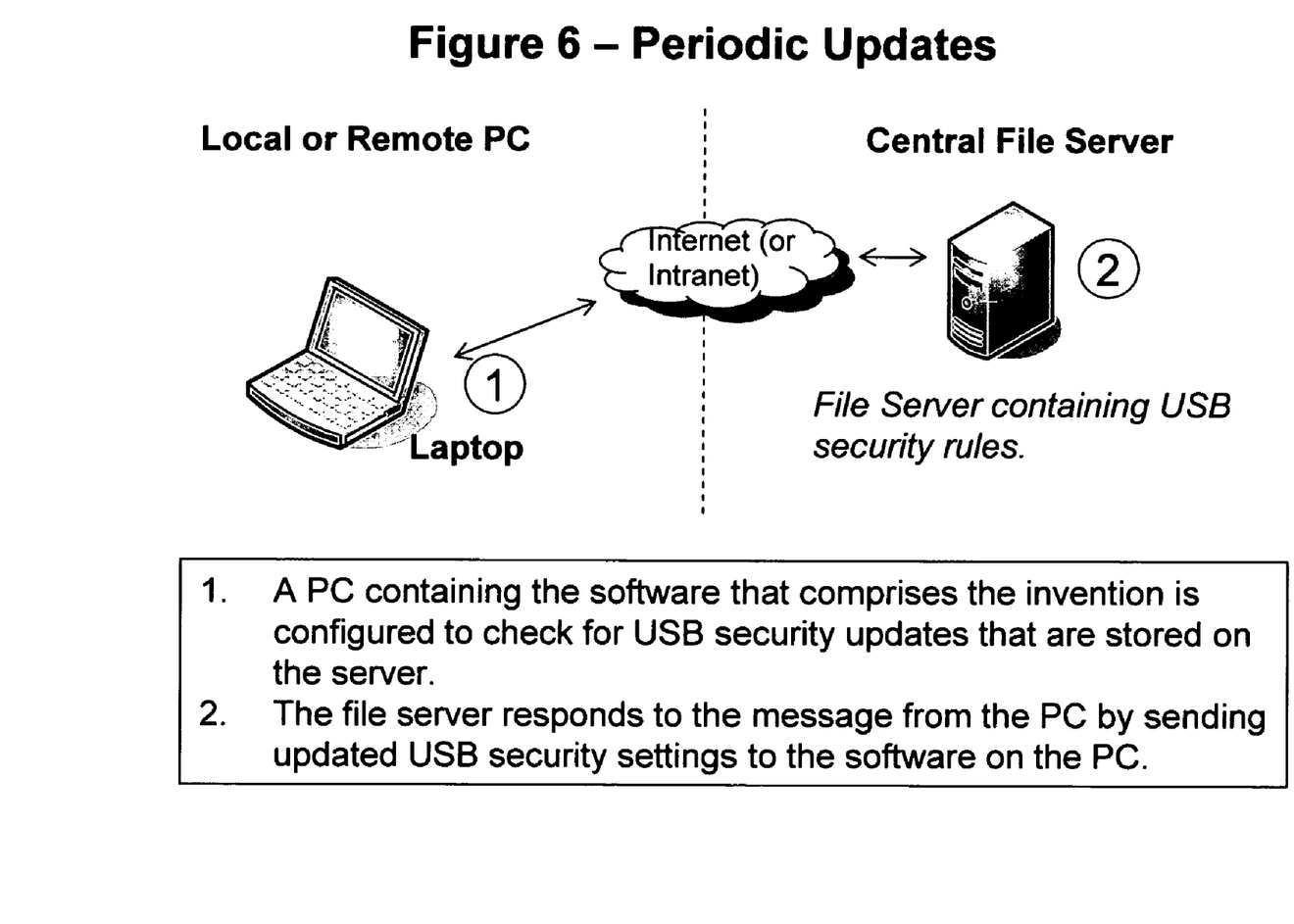
FIG. 6 shows an example whereby the invention is configured to get security parameter updates from a central file server.

As shown in FIG. 6, the invention can also be configured to periodically receive updates from the file server software via internet or intranet connection. The file server is used to update configuration rules to that are used control the USB devices and applications which may be used in accordance with the security policy. The file server is also used as a central repository for storing all logged all security events.

Having thus described the invention in detail, it should be apparent that various modifications and changes may be made without departing from the spirit and scope of the present invention. Consequently, these and other modifications are contemplated to be within the spirit and scope of the following claims.

I claim:

1. A method for controlling a USB device, accessed from a USB port on a personal computer comprising the steps of:
   the personal computer monitoring the USB port; the personal computer detecting the USB device connected to the USB port; a software module identifying a type of the USB device, the software module stored in a memory on the personal computer and comprising a configuration rule in accordance with a security policy;
   the software module determining that the USB device is authorized by comparing the type of the USB device to a list of USB device types stored in a parameter file in the memory of the personal computer;
   the software module determining that a file stored on the USB device is authorized by comparing the file to a list of files stored in the parameter file in the memory of the personal computer; and
   the software module, in accordance with the configuration rule and determining the USB device is authorized and the file is authorized, either allowing the personal computer to access the USB device or preventing the personal computer from accessing the USB device.

2. The method as defined in claim 1, whereby the software module on the personal computer periodically receives updates from a remote file server.

3. A method for controlling a device, accessed from a USB port on a personal computer comprising the steps of:
   the personal computer detecting the device connected to the USB port;
   a software module stored in a memory on the personal computer and comprising a configuration rule in accordance with a security policy, the software module receiving a security update from a remote computer via a network;
   the software module updating the configuration rule and a parameter file in accordance with the security update;
   the software module identifying a type of the device;
   the software module determining that the device is authorized by comparing the type of the device to a list of device types stored in the parameter file;
   the software module determining that a program stored on the device is authorized by comparing the program to a list of programs stored in the parameter file; and
   the software module, in accordance with the updated configuration rule and determining the USB device is authorized and the file is authorized, either allowing the personal computer to access the program or preventing the personal computer from accessing the program.

4. A method for controlling a device accessed from a port on a personal computer wherein the personal computer is in communication with a remote computer, comprising the steps of:
   detecting that the device is coupled to the personal computer;
   a software module stored in a memory of the personal computer and comprising a configuration rule in accordance with a security policy, the software module comparing the detected device to a list of devices stored in a parameter file on the personal computer;
   the software module sending a request for an update from the personal computer to the remote computer;
   the software module receiving the update from the remote computer and updating the parameter file;
   and
   the software module granting or denying access to the device based on the updated parameter file.

5. The method of claim 1, wherein the list of USB device types stored in the parameter file comprises authorized USB device types.

6. The method of claim 1, wherein the list of USB device types stored in the parameter file comprises unauthorized USB device types.

7. The method of claim 1, wherein the list of files stored in the parameter file comprises authorized files.

8. The method of claim 1, wherein the list of files stored in the parameter file comprises unauthorized files.

9. The method of claim 3, wherein the list of device types stored in the parameter file comprises authorized device types.

10. The method of claim 3, wherein the list of device types stored in the parameter file comprises unauthorized device types.

11. The method of claim 3, wherein the list of programs stored in the parameter file comprises authorized programs.

12. The method of claim 3, wherein the list of programs stored in the parameter file comprises unauthorized programs.

13. The method of claim 4, wherein the list of devices stored in the parameter file comprises authorized devices.

14. The method of claim 4, wherein the list of devices stored in the parameter file comprises unauthorized devices.

* * * * *